United States Patent
Weigand et al.

(10) Patent No.: US 12,288,345 B2
(45) Date of Patent: Apr. 29, 2025

(54) SIX-DEGREE-OF-FREEDOM (6DOF) TRACKING OF MOBILE HEAD MOUNTED DISPLAYS (HMDS)

(71) Applicant: AUDI AG, Ingolstadt (DE)

(72) Inventors: Christoph Weigand, Gaimersheim (DE); Stefan Mayer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 77 days.

(21) Appl. No.: 17/923,464

(22) PCT Filed: Apr. 9, 2021

(86) PCT No.: PCT/EP2021/059273
§ 371 (c)(1),
(2) Date: Nov. 4, 2022

(87) PCT Pub. No.: WO2021/223959
PCT Pub. Date: Nov. 11, 2021

(65) Prior Publication Data
US 2023/0196591 A1   Jun. 22, 2023

(30) Foreign Application Priority Data
May 6, 2020 (DE) .................. 10 2020 112 300.0

(51) Int. Cl.
| | |
|---|---|
| *G06T 7/246* | (2017.01) |
| *B60K 35/28* | (2024.01) |
| *B60K 35/81* | (2024.01) |
| *G06T 7/73* | (2017.01) |

(52) U.S. Cl.
CPC .............. *G06T 7/251* (2017.01); *B60K 35/28* (2024.01); *B60K 35/81* (2024.01); *G06T 7/75* (2017.01);
(Continued)

(58) Field of Classification Search
CPC . G06T 7/251; G06T 7/75; G06T 2207/30268; B60K 35/28; B60K 35/81; B60K 2360/177
See application file for complete search history.

(56) References Cited

U.S. PATENT DOCUMENTS

| | | | |
|---|---|---|---|
| 9,459,692 B1 * | 10/2016 | Li | ........................... G01S 19/14 |
| 10,885,819 B1 * | 1/2021 | Verbeke | ............. G02B 27/0093 |

(Continued)

FOREIGN PATENT DOCUMENTS

| | | | |
|---|---|---|---|
| DE | 10 2013 210 746 A1 | 12/2014 |
| DE | 10 2014 213 021 A1 | 1/2016 |

(Continued)

OTHER PUBLICATIONS

Seyed Hesameddin Najafi Shoushtari: "Fast 3D Object Detection and Pose Estimation for Augmented Reality Systems",PhD Dissertation, 2006, XP055193250, http://mediatum.ub.tum.de/doc/604471/604471.pdf, 167 pages.

(Continued)

*Primary Examiner* — Michael Pervan
(74) *Attorney, Agent, or Firm* — STAAS & HALSEY LLP

(57) ABSTRACT

When at least one mobile head-mounted display (HMD) is located in at least one vehicle, a control unit of the HMD performs inside-out tracking based on a six-degree-of-freedom (6DOF) algorithm with the aid of at least one camera image captured by at least one camera, using a 6DOF-algorithm-based translation of the at least one mobile HMD. The HMD control unit executes an application that creates an edge model of an interior of the vehicle and provides automated computer-vision-based 6DOF tracking of the at least one mobile HMD.

13 Claims, 1 Drawing Sheet

(52) U.S. Cl.
CPC ............... *B60K 2360/177* (2024.01); *G06T 2207/30268* (2013.01)

(56) References Cited

U.S. PATENT DOCUMENTS

| | | | | |
|---|---|---|---|---|
| 10,969,579 | B2* | 4/2021 | Haar | ............... G06F 1/163 |
| 11,366,326 | B2* | 6/2022 | Kühne | ............... G02B 27/0179 |
| 11,514,617 | B2* | 11/2022 | Kuo | ............... G06T 7/70 |
| 2002/0105484 | A1 | 8/2002 | Navab et al. | |
| 2010/0109976 | A1 | 5/2010 | Gilbert et al. | |
| 2020/0218065 | A1* | 7/2020 | Haar | ............... G06F 3/011 |
| 2021/0199980 | A1* | 7/2021 | Kühne | ............... G06F 3/011 |
| 2022/0051449 | A1* | 2/2022 | Kuo | ............... G06T 19/006 |

FOREIGN PATENT DOCUMENTS

| | | | |
|---|---|---|---|
| DE | 10 2014 225 222 A1 | 6/2016 | |
| DE | 10 2016 225 268 A1 | 6/2018 | |
| DE | 10 2017 215 163 A1 | 2/2019 | |
| DE | 10 2018 201 509 A1 | 8/2019 | |
| DE | 10 2019 117 485 A1 | 2/2020 | |
| EP | 2 491 530 B1 | 6/2019 | |
| GB | 2623041 A * | 4/2024 | ............. B60K 35/00 |

OTHER PUBLICATIONS

European Office Action dated Jan. 22, 2024 for European Application No. 21720183.9.
International Search Report dated Jul. 22, 2021 for International Application No. PCT/EP2021/059273.
Written Opinion of the International Searching Authority dated Jul. 22, 2021 for International Application No. PCT/EP2021/059273.
10 2020 112 300.0, May 6, 2020, Christoph Weigand, Audi AG.
PCT/EP2021/059273, Apr. 9, 2021, Christoph Weigand, Audi AG.
German Office Action issued in counterpart German Application No. 10 2020 112 300.0 dated Dec. 29, 2024.

* cited by examiner

SIX-DEGREE-OF-FREEDOM (6DOF) TRACKING OF MOBILE HEAD MOUNTED DISPLAYS (HMDS)

CROSS REFERENCE TO RELATED APPLICATIONS

This application is a U.S. national stage of International Application No. PCT/EP2021/059273, filed on Apr. 9, 2021. The International Application claims the priority benefit of German Application No. 10 2020 112 300.0 filed on May 6, 2020. Both the International Application and the German Application are incorporated by reference herein in their entirety.

BACKGROUND

Described below is a system for sensing at least one mobile head-mounted display (HMD), having at least one vehicle and the at least one HMD, wherein the vehicle has at least one regulating device and at least one wireless interface, wherein the regulating device is configured to provide vehicle sensor data, and wherein the at least one HMD includes at least one camera, a control unit, a wireless interface, and at least one application, wherein the control unit of the HMD is configured to execute inside-out tracking based on a six-degree-of-freedom (6DOF) algorithm with the aid of at least one camera image recorded by the at least one camera and to determine a 6DOF-algorithm-based translation of the at least one mobile HMD.

Virtual reality (VR) and augmented reality (AR) are technologies which are already presently widespread for gaming and also productivity applications. In this case, a user wears a so-called head-mounted display (HMD). It is fundamentally important for the use of VR and AR headsets to accurately locate the HMD during use, to be able to display the content in a visually correct manner for the user. In particular, a 6DOF translation in the X, Y, and Z directions and a rotation around the above-mentioned axes is determined here.

The locating or sensing of an HMD is designated here as tracking. A differentiation is made here between inside-out tracking (from the HMD to the outside) and outside-in tracking (from the outside to the HMD). Up to this point, outside-in tracking has been known in stationary applications using external tracking sensors, for example, via infrared.

In future, however, the development of HMD will also focus on mobile HMD, without external tracker, with inside-out tracking. Present applications are restricted to static environments, however.

For example, a method is known from document EP 2 491 530 B1 for determining a pose of a camera on a head-mounted display screen system in a vehicle. The pose of the camera is determined in six degrees of freedom optically using an edge model from environmental data.

A system is known from document US 20 020 105 484 A1 for calibrating a display device worn on the head of a user for a display of virtual objects in a real environment. The display device has a sensing unit operating in six degrees of freedom for image data-based generation of an environmental model.

A device is known from document US 20 100 109 976 A1 for tracking a display unit on the helmet of a vehicle occupant. The helmet has an optical sensor which is used, with six degrees of freedom, for detecting orientation marks of a vehicle interior and which is suitable for virtual reality applications.

The VR-HMD and AR-HMD known in the related art already implement tracking algorithms in the firmware, wherein a static environment is assumed, however. Due to the hardware-dependent implementation of the 6DOF algorithms in the firmware in current HMD, it is not possible to deactivate a translation of the inside-out tracking.

SUMMARY

Described below is a system which enables use of a mobile HMD in dynamic environments.

The system for sensing at least one mobile head-mounted display (HMD) includes at least one vehicle and the at least one HMD. The vehicle has at least one regulating device and at least one wireless interface. The regulating device is configured to provide vehicle sensor data, and the at least one HMD has at least one camera, a control unit, a wireless interface, and executes at least one application. The control unit of the HMD is configured to execute inside-out tracking based on a six-degree-of-freedom (6DOF) algorithm with the aid of at least one camera image recorded by the at least one camera and to determine a 6DOF-algorithm-based translation of the at least one mobile HMD. The at least one HMD may be glasses or a lens. The 6DOF algorithm is implemented integrated in firmware of the HMD.

The application is additionally configured to provide an edge model of an interior of the vehicle and, based on the edge model, to provide automated computer-vision-based 6DOF tracking of the at least one mobile HMD. Tracking is locating or sensing of the HMD here.

Computer-vision means machine vision. The system is accordingly configured to enable machine vision in the interior of the vehicle through the at least one camera of the HMD. Moreover, the system is configured to provide an edge model of the interior.

The system offers the advantage that due to the incorporation of the edge model in the computer-vision-based 6DOF tracking, a consideration of a dynamic environment, which is perceived, for example, through windowpanes of the vehicle by the at least one camera, is corrected. Incorrect locating of the HMD in the vehicle, which can result in a sudden change of a viewing position of a user within the VR and AR contents, is thus avoided. The viewing position of the user is in this case also the viewing position of the at least one HMD camera, which provides the computer-vision-based vision.

In one refinement, the application based on the computer-vision-based 6DOF tracking is configured to base a calculation of a computer-vision-based translation of the HMD on the edge model, wherein the application is configured to determine the computer-vision-based translation of the HMD relative to the interior of the vehicle. With the aid of the edge model of the interior of a respective vehicle, the system is configured to locate an accurate position of the at least one HMD in the interior of the vehicle. The interior of the vehicle is provided here as a reference point for the locating or the translation of the HMD.

In a further refinement, the application is configured to compensate a translation of the HMD provided by the 6DOF algorithm based on the determined computer-vision-based translation of the HMD. This offers the advantage that an incorrectly located position of the at least one HMD in the interior of the vehicle determined by the 6DOF algorithm is corrected by the new position determination on the basis of the edge model. Mobile AR/VR-HMD can thus be used during a dynamic journey in a dynamic environment. The system prevents a usage of VR-HMD and AR-HMD without external tracker with inside-out tracking.

In one embodiment, the application is configured to create the edge model based on the at least one camera image recorded by the at least one camera. The system is configured with the aid of the at least one camera to depict the interior of the vehicle as an edge model. The application is generally configured as a VR/AR application.

In one refinement, the system is configured to hide surroundings perceived by the at least one camera of the at least one HMD. For example, the system is configured to exclude camera images from consideration in the calculation of the creation of the edge model based on a spacing or distance setting.

In an alternative embodiment, the regulating device of the vehicle stores an edge model and transmits the edge model, upon an initial connection to the HMD, to the application executed by the HMD. The application is configured to base the computer-vision-based calculation of the translation of the HMD on the edge model. The alternative embodiment is thus configured, instead of a dynamic creation of the edge model of the interior, to transmit information or the edge model to the HMD. In general, the regulating device has at least one wireless interface which is configured to transmit the edge model to a wireless interface of the HMD. The edge model is generally stored as an item of vehicle model information of a respective vehicle.

In one refinement, the control unit is configured to transmit the vehicle sensor data provided by the regulating device for calculating an intrinsic movement of the vehicle via the at least one wireless interface of the HMD to the application of the HMD, wherein the application is configured to determine the intrinsic movement of the vehicle and to use it as the basis of the calculation of the computer-vision-based translation relative to the interior of the vehicle. This offers the advantage that a translation of the vehicle can be taken into consideration in order to compensate for the position of the HMD calculated by the 6DOF algorithm.

The vehicle sensor data are generally sensed by at least two sensors, which are configured to transmit the vehicle sensor data to at least one regulating device, wherein the regulating device is configured to store the vehicle sensor data. In general, the vehicle sensor data are provided via at least one communication channel in the vehicle, for example via Flexray, CAN, or Ethernet, to the at least one regulating device having the at least one wireless interface. The regulating device is configured to transmit the vehicle sensor data via the wireless interface to the wireless interface of the HMD.

In a further refinement, the at least one wireless interface of the regulating device and/or the HMD is a Bluetooth Low Energy (BLE) connection. In an alternative embodiment, the at least one wireless interface of the regulating device and/or the HMD is a local Wi-Fi connection or a classic Bluetooth connection.

The at least one HMD optionally has at least one inertial measuring unit (IMU), which generally includes at least one acceleration sensor and at least one rotation rate sensor, and is configured to sense sensor data. The IMU therefore represents a sensory measuring unit of an inertial navigation system.

Also described herein is a method for carrying out 6DOF tracking of a mobile HMD in a vehicle during a dynamic journey, using the above-described system.

As described above, the method uses an edge model of an interior of the vehicle and automated computer-vision-based 6DOF tracking, executed either in succession or simultaneously. In the method, a computer-vision-based translation of the HMD relative to the interior of the vehicle is calculated based on the edge model and a translation of the HMD 11 provided by six-degree-of-freedom (6DOF) algorithm-based inside-out which also may be executed in succession or simultaneously. In addition, the translation of the HMD 11 based on the 6DOF algorithm is compensated with the aid of the computer-vision-based translation of the HMD 11.

In one refinement of the method, the edge model is created and provided based on at least one camera image recorded by at least one camera of the HMD. The system is thus configured to use the basis of the camera images sensed by the at least one camera, which are also used for inside-out tracking, as the foundation for the creation of an edge model of the vehicle interior. The edge model created in this way is usable as a 0 reference for the translation of the HMD.

In an alternative refinement, the edge model is transmitted to the HMD by a regulating device of the vehicle upon an initial connection of the vehicle to the HMD. The alternative embodiment is thus configured, instead of a dynamic creation of the edge model of the interior, to transmit information or the edge model to the HMD. The edge model is in general part of items of vehicle model information here, which are stored in a regulating device of the vehicle.

BRIEF DESCRIPTION OF THE DRAWINGS

These and other aspects and advantages will become more apparent and more readily appreciated from the following description of the exemplary embodiments, taken in conjunction with the accompanying drawings of which.

These and other aspects and advantages will become more apparent and more readily appreciated from the following description of exemplary embodiments, taken in conjunction with the accompanying drawings, wherein identical components are identified by identical reference signs. In the figures.

DETAILED DESCRIPTION

Figure 1:
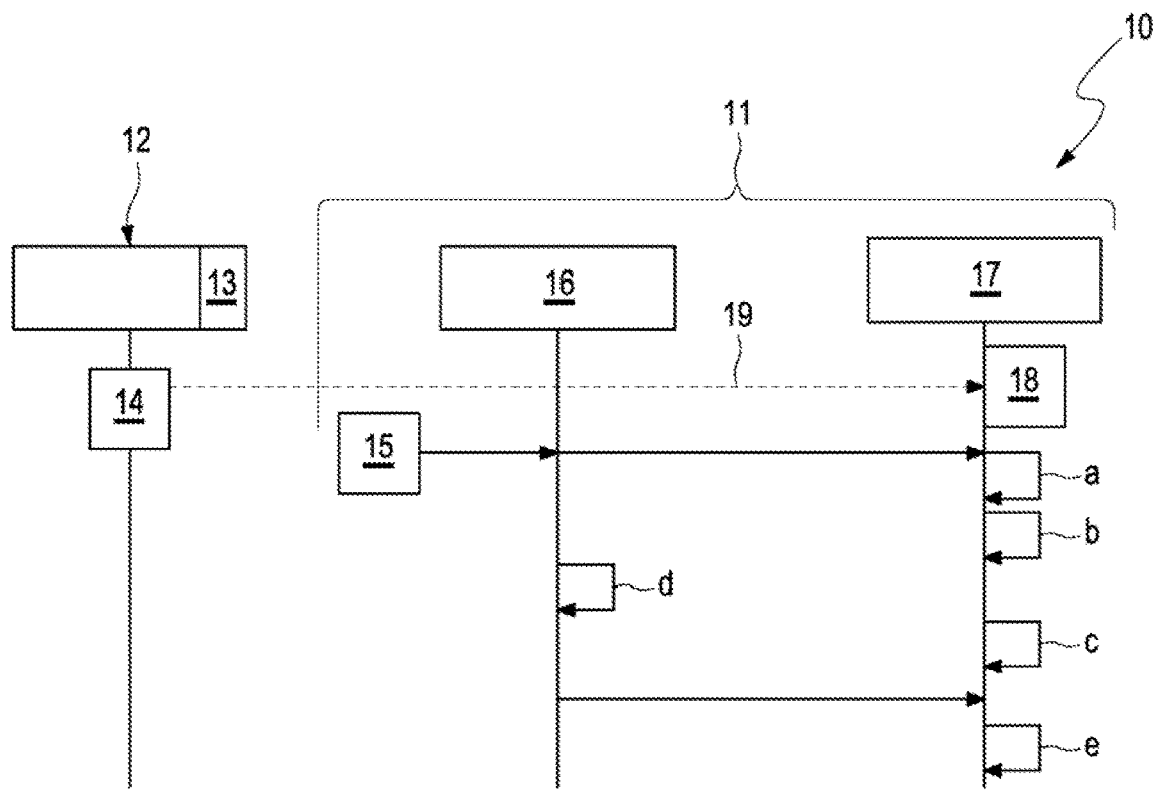
FIG. 1 is a block diagram of an embodiment of a system having an edge model based on camera images of cameras integrated in the HMD.

FIG. 1 illustrates an embodiment of a system 10 having an edge model based on camera images of cameras 15 integrated in an HMD 11. The system 10 for sensing at least one mobile head-mounted display (HMD) 11 includes at least one vehicle 12 and the at least one HMD 1.

The vehicle 12 has at least one regulating device 13 and at least one wireless interface 14, wherein the regulating device 13 is configured to provide vehicle sensor data.

The at least one HMD 11 includes at least one camera 15, a control unit 16, a wireless interface 18, and at least one application 17, wherein the control unit 16 of the HMD 11 is configured, with the aid of at least one camera image recorded by the at least one camera 15, to execute inside-out tracking based on a 6DOF algorithm and to determine a 6DOF-algorithm-based translation of the HMD 11.

The application 17 is configured to provide an edge model of an interior of the vehicle 12 and, based on the edge model, to provide automated computer-vision-based 6DOF tracking.

The application 17 is configured here to use the edge model as the basis of a calculation of a computer-vision-based translation of the HMD, wherein the application 17 is configured to determine the computer-vision-based translation of the HMD 11 relative to the interior of the vehicle 12. Moreover, the application 17 is configured to compensate a translation of the HMD 11 provided by the 6DOF algorithm based on the determined computer-vision-based translation of the HMD 11.

The application 17 creates the edge model itself here. The application 17 is configured here to create the edge model based on the at least one camera image recorded by the at least one camera 15.

In general, the regulating device 13 of the vehicle 12 is configured to transmit vehicle sensor data 19 determined based on vehicle sensors of the vehicle 12 to the application 17, wherein the application 17 is configured to determine an intrinsic movement of the vehicle based on the transmitted vehicle sensor data 19. The system 10 is configured to use the determined intrinsic movement of the vehicle 12 as the basis of the calculation of the computer-vision-based 6DOF tracking of the HMD 11.

FIG. 1 moreover shows the method for carrying out 6DOF tracking of a mobile HMD 11 in the vehicle 12 during a dynamic journey using the above-described system 10.

In an embodiment of the method obtains an edge model of an interior of the vehicle, at a in FIG. 1 and automated computer-vision-based 6DOF tracking is performed at b. The operations a and b can alternately be executed in succession or simultaneously.

In an embodiment of the method, a computer-vision-based translation of the HMD 11 relative to the interior of the vehicle 12 is calculated at c in FIG. 1 based on the edge model and a translation of the HMD 11 is provided at d by inside-out tracking based on a six-degree-of-freedom (6DOF), either in succession or simultaneously. In addition, the translation of the HMD 11 provided at e, by inside-out tracking based on a 6DOF algorithm is compensated with the aid of the computer-vision-based translation of the HMD 11.

In an embodiment of the method, the edge model based on a camera image recorded by at least one camera 15 of the HMD 11 is created and provided.

The at least one camera 15 is configured here to perceive the surroundings and record them in camera images. These camera images are in particular used as the foundation for computer-vision-based locating of the at least one HMD 11. An edge model is created here based on the algorithms from the camera images of the environment. A spatial boundary or maximum distance for the evaluation can ensure here that only references in the interior of the vehicle 12 and not from the dynamic environment are used for the creation of the edge model.

With the aid of the calculated edge model, based on algorithms, an X, Y, and Z position of the HMD 11 relative to the edge model can be calculated. The translation of the HMD 11 relative to the edge model is generally used here as a 0 reference of the desired HMD 11 camera position. In the application 17, the translation of the HMD 11 internal 6DOF tracking is corrected by a transformation to the 0 reference, in particular 3DOF tracking relative to the edge model.

The position of the HMD camera calculated incorrectly internally due to the dynamic environment during the journey of the vehicle by the HMD is thus compensated in the application by the actual position of the HMD in the vehicle. The mathematical operation for this purpose is a vector addition of an incorrect vector plus a delta vector for the 0 reference.

Figure 2:
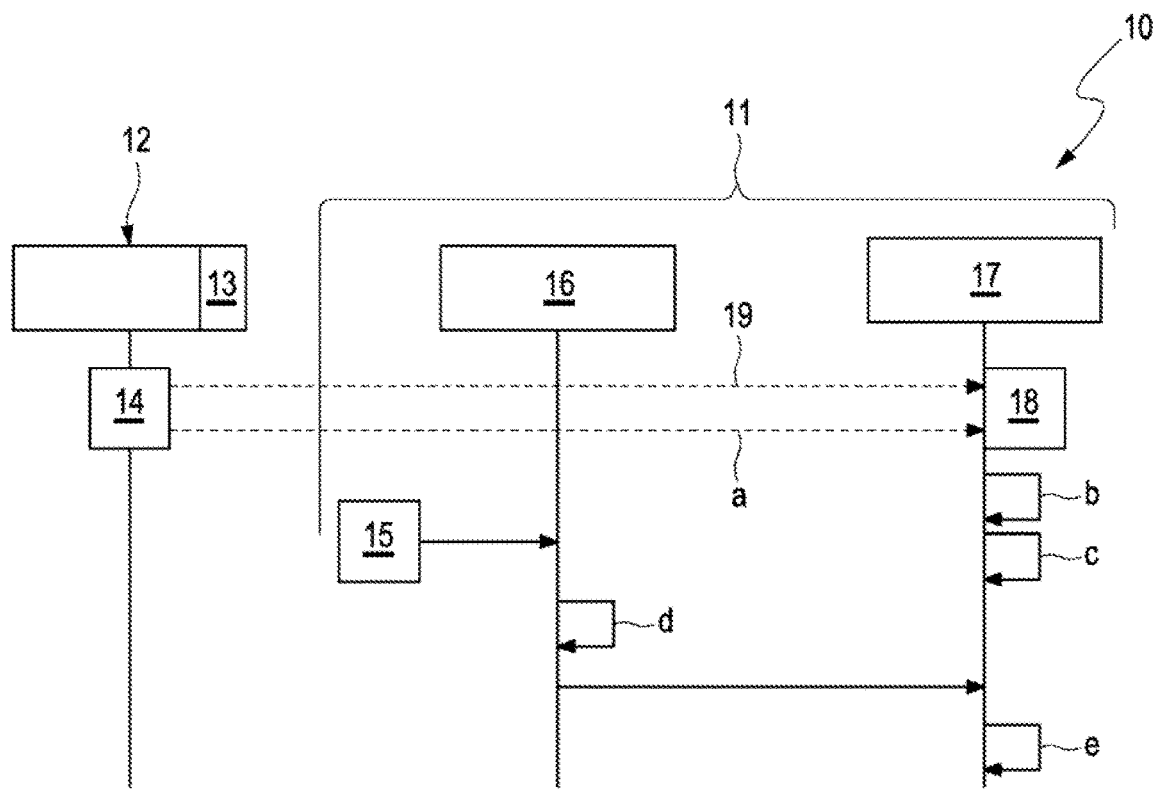
FIG. 2 is a block diagram of a further embodiment of the system shown in FIG. 1.

FIG. 2 illustrates a further embodiment of the system 10 in FIG. 1. The system 10 includes the vehicle 12, having the regulating device 13 and the wireless interface 14, as well as the HMD 11 having the camera 15, the control unit 16, the wireless interface 18, and the application 17. In this embodiment, an edge model based on items of vehicle model information is provided by the regulating device 13 to the HMD 11.

During the development process of the vehicle 12, there is a large number of different models of the vehicle 12. In general, an edge model has been created from one of these models, which is stored together with further items of vehicle model information in the regulating device 13. In the present embodiment, upon the first connection of the HMD 11 to the vehicle 12, the edge model is transmitted via the wireless interface 14 of the regulating device 13 to the HMD 11.

FIG. 2 also illustrates an embodiment of the method described in relation to FIG. 1 for carrying out the 6DOF tracking of the mobile HMD 11 in the vehicle 12 during a dynamic journey, using reference characters a to e. The application 17 is configured to determine an intrinsic movement of the vehicle 12 based on vehicle sensor data 19 transmitted by the regulating device 14 and use it as the basis of the further calculation. In this embodiment of the method, however, the edge model, instead of a determination based on camera images of the at least one HMD, is transmitted by a regulating device 13 of the vehicle 12 to the HMD 11 upon an initial connection of the vehicle 12 to the HMD 11.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2 1865 (Fed. Cir. 2004).

LIST OF REFERENCE NUMERALS 10 system
11 HMD
12 vehicle
13 regulating device
14 wireless interface of regulating device
15 camera
16 control unit
17 application
18 air interface of HMD
19 vehicle sensor data.

The invention claimed is:

1. A system, comprising
at least one vehicle having at least one regulating device and at least one vehicle wireless interface, the regulating device configured to provide vehicle sensor data; and
at least one mobile head-mounted display including at least one camera, a control unit and a display wireless interface, the control unit executing at least one application and configured, based on at least one camera image recorded by the at least one camera, inside-out tracking based on a six-degree-of-freedom algorithm, and an edge model of an interior of the vehicle, to provide automated computer-vision-based six-degreeof-freedom tracking and translation of the at least one mobile head-mounted display based on the edge model, wherein the at least one mobile head-mounted display corrects for a dynamic environment of the at least one vehicle perceived by the at least one head-mounted display through window panes of the at least one vehicle.

2. The system as claimed in claim 1, wherein the application is configured, based on the computer-vision-based six-degree-of-freedom tracking and the edge model to calculate a computer-vision-based translation of the mobile head-mounted display relative to the interior of the vehicle.

3. The system as claimed in claim 1, wherein the application is configured, based on the computer-vision-based translation of the mobile head-mounted display, to compensate the translation of the mobile head-mounted display provided by the six-degree-of-freedom algorithm.

4. The system as claimed in claim 3, wherein the application is configured to create the edge model based on the at least one camera image recorded by the at least one camera.

5. The system as claimed in claim 3,
wherein the regulating device of the vehicle stores the edge model and transmits the edge model to the application of the mobile head-mounted display upon an initial connection to the mobile head-mounted display, and
wherein the application is configured to calculate, based on the edge model, the computer-vision-based translation of the mobile head-mounted display.

6. The system as claimed in claim 1, wherein the application is configured to create the edge model based on the at least one camera image recorded by the at least one camera.

7. The system as claimed in claim 1,
wherein the regulating device of the vehicle stores the edge model and transmits the edge model to the application of the mobile head-mounted display upon an initial connection to the mobile head-mounted display, and
wherein the application is configured to calculate, based on the edge model, the computer-vision-based translation of the mobile head-mounted display.

8. The system as claimed in claim 1,
wherein the control unit is configured to transmit the vehicle sensor data provided by the regulating device for calculating an intrinsic movement of the vehicle via the at least one vehicle wireless and the display wireless interface of the mobile head-mounted display to the application of the mobile head-mounted display,
wherein the application is configured to determine the intrinsic movement of the vehicle based on the vehicle sensor data and calculate the computer-vision-based translation relative to the interior of the vehicle.

9. The system as claimed in claim 8, wherein at least one of the at least one vehicle wireless interface of the regulating device and the display wireless interface is a wireless low energy connection.

10. The system as claimed in claim 1, wherein at least one of the at least one vehicle wireless interface of the regulating device and the display wireless interface is a wireless low energy connection.

11. A method for carrying out six-degree-of-freedom tracking of a mobile head-mounted display in a vehicle during a dynamic journey, comprising:
providing an edge model of an interior of the vehicle;
providing automated computer-vision-based six-degree-of-freedom tracking;
calculating a computer-vision-based translation of the mobile head-mounted display relative to the interior of the vehicle based on the edge model;
providing a translation of the mobile head-mounted display by inside-out tracking based on a six-degree-of-freedom algorithm;
compensating the translation of the mobile head-mounted display based on the inside-out tracking with the computer-vision-based translation of the mobile head-mounted display; and
correcting for a dynamic environment of the vehicle perceived by the at least one head-mounted display through window panes of the vehicle.

12. The method as claimed in claim 11, wherein the edge model is created and provided based on a camera image recorded by at least one camera of the mobile head-mounted display.

13. The method as claimed in claim 11, wherein the edge model is transmitted by a regulating device of the vehicle to the mobile head-mounted display upon an initial connection of the vehicle to the mobile head-mounted display.

* * * * *